(12) United States Patent
Kim

(10) Patent No.: US 7,690,557 B2
(45) Date of Patent: Apr. 6, 2010

(54) SYSTEM AND METHOD FOR DISPLAYING RECEIVED DATA USING SEPARATE DEVICE

(75) Inventor: Jae-hak Kim, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1102 days.

(21) Appl. No.: 11/324,585

(22) Filed: Jan. 4, 2006

(65) Prior Publication Data

US 2006/0151593 A1    Jul. 13, 2006

(30) Foreign Application Priority Data

Jan. 8, 2005    (KR)    ........................ 10-2005-0001942

(51) Int. Cl.
*G06F 17/00*    (2006.01)
(52) U.S. Cl. ....................... 235/375; 455/410
(58) Field of Classification Search ................ 235/375; 455/410, 412.1, 566
See application file for complete search history.

(56) References Cited

U.S. PATENT DOCUMENTS

| | | | | |
|---|---|---|---|---|
| 5,880,732 A * | 3/1999 | Tryding | ....................... | 715/810 |
| 2002/0073234 A1 | 6/2002 | Ma | | |
| 2004/0046783 A1* | 3/2004 | Montebovi | .................. | 345/730 |
| 2006/0264209 A1* | 11/2006 | Atkinson et al. | ......... | 455/422.1 |
| 2007/0015504 A1* | 1/2007 | Kusuda et al. | ........... | 455/426.2 |

FOREIGN PATENT DOCUMENTS

| | | |
|---|---|---|
| CN | 1505374 A | 6/2004 |
| EP | 0 836 301 A1 | 4/1998 |
| JP | 7-49878 A | 2/1995 |
| JP | 2001-522073 A | 11/2001 |
| JP | 2002-353874 A | 12/2002 |
| JP | 2004-005529 A | 1/2004 |
| KR | 2001-0028757 A | 4/2001 |
| KR | 2002-0041963 A | 6/2002 |
| KR | 10-2004-0074562 A | 8/2004 |

OTHER PUBLICATIONS

"Multimedia Message Service and its Implementation.", China Data Communications, Oct. 31, 2003, p. 26-31, No. 10, 1994-2006 China Academic Journal Electronic Publishing House.

* cited by examiner

*Primary Examiner*—Ahshik Kim
(74) *Attorney, Agent, or Firm*—Sughrue Mion, PLLC (57) ABSTRACT

A method and apparatus for displaying received data using a separate device that makes a user's receiving terminal, that has received only a unique code of data, transmit the unique code to a separate display device connected to the Internet, and which makes the display device access a server, in which the data is stored, and display the data corresponding to the unique code. The apparatus displays received data using a code generation unit for generating a first unique code that matches metadata received from a data server that stores the data and the metadata, a first communication unit for transmitting the first unique code to a receiving terminal, and a second communication unit for receiving a second unique code from a display device and transmitting the stored metadata that matches the first unique code to the display device if the first unique code corresponds to the second unique code.

19 Claims, 5 Drawing Sheets

SYSTEM AND METHOD FOR DISPLAYING RECEIVED DATA USING SEPARATE DEVICE

CROSS-REFERENCE TO RELATED APPLICATION

This application claims priority from Korean Patent Application No. 10-2005-0001942 filed on Jan. 8, 2005 in the Korean Intellectual Property Office, the disclosure of which is incorporated herein by reference in its entirety.

BACKGROUND OF THE INVENTION

1. Field of the Invention

The present invention relates to a system and method for displaying received data using a separate device, and more particularly to a system and method for displaying received data using a separate device that makes a user's receiving terminal, which has received only a unique code of data to be received, transmit the unique code to a separate display device connected to the Internet by wire/wireless means, and makes the display device access a server, in which the data is stored, and displays the data corresponding to the unique code.

2. Description of the Prior Art

A conventional data transmission and display system provides means for operating in a manner that if a data provider sends data to a data receiver of a specified terminal using the Internet or separate wire/wireless means, the data receiver confirms the data via the terminal or a server, in which the data is stored, by way of the Internet.

Figure 1:
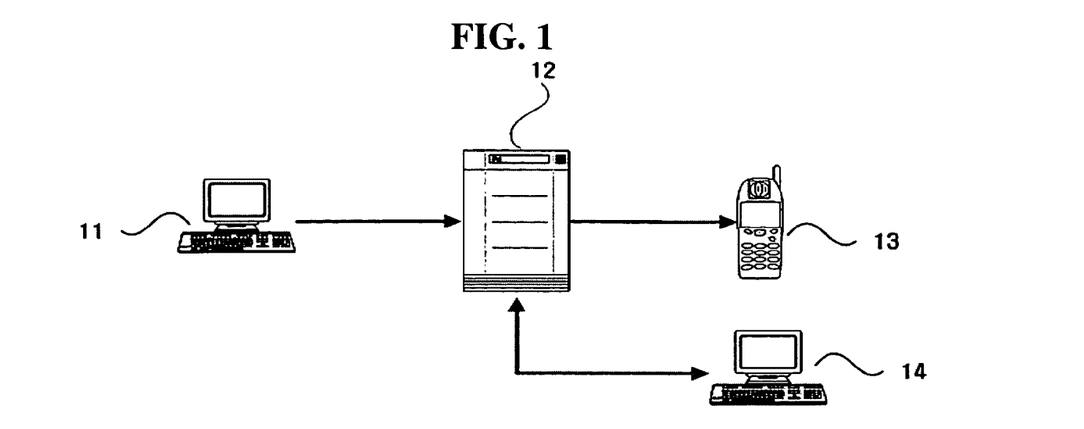
FIG. 1 is a view illustrating a conventional data transmission and display system using e-mail.

FIG. 1 is a view illustrating a conventional data transmission and display system using e-mail.

The conventional data transmission and display system using e-mail includes a first PC 11, a second PC 14, a mail server 12 and a wireless terminal 13.

A sender accesses the mail server 12 using the first PC 11, and transmits an e-mail accompanied by data to a receiver. Accordingly, the receiver can confirm that e-mail was sent by the sender by accessing the mail server 12 using the second PC 14, and in this case, the receiver may be notified of the reception of e-mail using the wireless terminal 13. Accordingly, the mail server 12 should include SMS (Short Message Service) technology for sending a short message to the wireless terminal 13.

Consequently, in order for the receiver to confirm the received mail and to access the mail server 12 in the conventional data transmission and display system using e-mail, a PC 14 that can access the Internet should be provided and personal information should be inputted.

Figure 2:
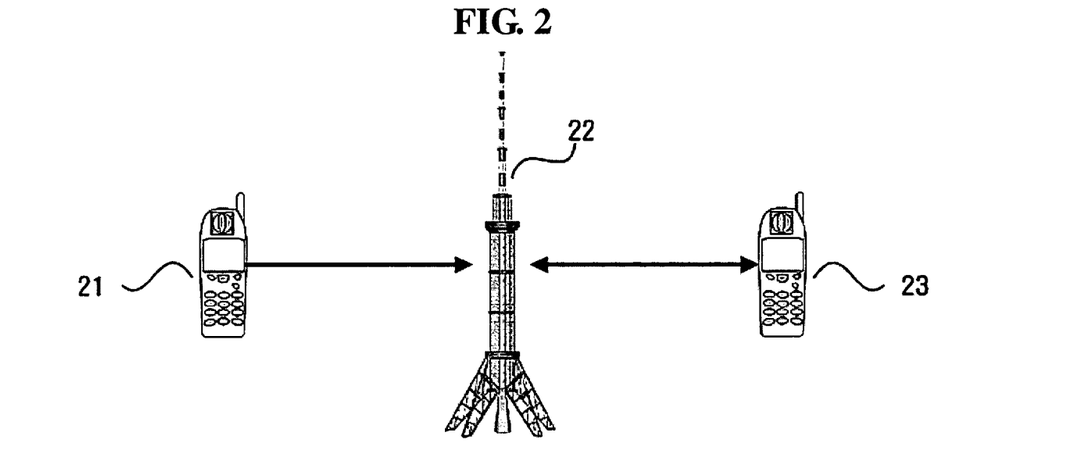
FIG. 2 is a view illustrating a conventional data transmission and display system using wireless terminals.

FIG. 2 is a view illustrating a conventional data transmission and display system using wireless terminals.

This system includes a first wireless terminal 21, a second wireless terminal 23 and a terminal repeater 22.

A sender transmits data stored or temporarily stored in the first wireless terminal 21 to the second wireless terminal 23 using the first wireless terminal 21. The terminal repeater 22 first receives the transmitted data, and transfers the data to the second wireless terminal 23 through a proper path.

Accordingly, the receiver can confirm the received data using the second wireless terminal 23. In this case, the second wireless terminal 23 must process the received data. For example, if moving image data is received, the second wireless terminal 23 must have means for reproducing the moving image data.

As described above, in the case of the conventional data transmission and display system using wireless terminals, the sender's intention may not be properly transferred to the receiver due to the limitations of the size and resolution of the display unit. Meanwhile, in the case of the conventional data transmission and display system using e-mail, a PC that can access the Internet should be provided and user information required to access the e-mail server should be inputted causing inconvenience for the user.

Meanwhile, Korean Patent Unexamined Publication No. 2001-0028757 discloses a short-distance wireless communication system using Bluetooth and particularly a method for displaying information received in a portable information terminal on an external display device. According to this method, only text information stored in the portable information terminal is extracted and displayed on the external display, and thus, it is difficult to apply this method to large capacity data such as a moving image data due to the limited memory capacity of the portable information terminal.

SUMMARY OF THE INVENTION

Accordingly, the present invention has been made to address the above-mentioned problems occurring in the prior art, and an aspect of the present invention is to make a user's receiving terminal, that has received only a unique code of data, transmit the unique code to a separate display device connected to the Internet by wire/wireless means, and to make the display device access a server in which the data is stored and display the data corresponding to the unique code.

Another aspect of the present invention is to remove the limitations of the display performance of a receiving terminal.

Still another aspect of the present invention is to remove a process of inputting user information for data confirmation by receiving and displaying data using the unique code of the data only.

Additional advantages, aspects, and features of the invention will be set forth in part in the description which follows and in part will become apparent to those having ordinary skill in the art upon examination of the following or may be learned from practice of the invention.

In an aspect of the invention, there is provided an apparatus for displaying received data using a separate device, according to an embodiment of the present invention, which comprises a code generation unit for generating a first unique code that matches metadata received from a data server that stores the data and the metadata, a first communication unit for transmitting the first unique code to a receiving terminal, and a second communication unit for receiving a second unique code from a display device and transmitting the stored metadata that matches the first unique code to the display device if the first unique code corresponds to the second unique code.

In another aspect of the present invention, there is provided an apparatus for displaying received data using a separate device, which comprises a fourth communication unit for receiving a unique code of specified data from a receiving terminal, a fifth communication unit for transmitting the received unique code to a data repeater and receiving metadata of the data that corresponds to the unique code from the data repeater, and a display unit for receiving and outputting the data that corresponds to the metadata from a data server that stores the data and the metadata.

In still another aspect of the present invention, there is provided a method for displaying received data using a separate device, which comprises the steps of generating a first unique code that matches metadata received from a data server that stores the data and the metadata, transmitting the first unique code to a receiving terminal, and receiving a second unique code from a display device and transmitting the stored metadata that matches the first unique code to the display device if the first unique code corresponds to the second unique code.

In still another aspect of the present invention, there is provided a method for displaying received data using a separate device, which comprises the steps of receiving a unique code of specified data from a receiving terminal, transmitting the received unique code to a data repeater and receiving metadata of the data that corresponds to the unique code from the data repeater, and receiving and outputting the data that corresponds to the metadata from a data server that stores the data and the metadata.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, non-limiting embodiments of the present invention will be described in detail with reference to the accompanying drawings. The aspects and features of the present invention and methods for achieving the aspects and features will be apparent by referring to the non-limiting embodiments to be described in detail with reference to the accompanying drawings. However, the present invention is not limited to the non-limiting embodiments disclosed hereinafter, but will be implemented in diverse forms. The matters defined in the description, such as detailed construction and elements, are only provided to assist those of ordinary skill in the art in a comprehensive understanding of the invention, and the present invention is only defined within the scope of appended claims. In the whole description of the present invention, the same drawing reference numerals are used for the same elements across various figures.

Figure 3:
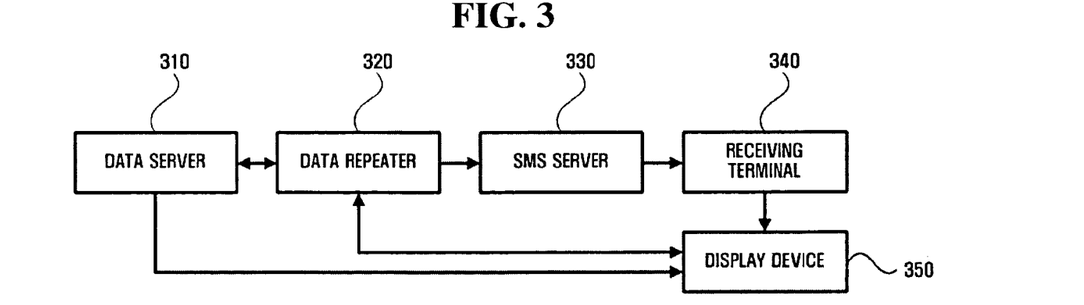
FIG. 3 is a block diagram illustrating a system for displaying received data using a separate device according to an embodiment of the present invention.

FIG. 3 is a block diagram illustrating a system for displaying received data using a separate device according to an embodiment of the present invention.

The system for displaying received data using a separate device according to the present invention includes a data server 310, a data repeater 320, an SMS (Short Message Service) server 330, a receiving terminal 340 and a display device 350.

The data server 310 includes at least one of a mail server, an advertisement server and an IDC (Internet Data Center) server. The data server serves to receive and store data such as e-mails, advertisements, documents, and others, from a sender, and transmit the stored data according to a receiver's request.

The data server 310 that has received the data from the sender transmits information about the received data to the data repeater 320. In this case, it is preferable, but not necessary, that the metadata that is transmitted includes the data format, data size, title of the data, storage position of the data, address of the sender, and the address of the receiver.

Here, it is preferable, but not necessary, that the storage position of the data includes the IP address of the data server 310, name of a folder in which data is stored, and the name of a data file.

The data repeater 320 that has received the metadata from the data server 310 generates a unique code of the metadata and stores the metadata and the unique code so that they match each other. Additionally, the data repeater 320 transmits the unique code to the receiving terminal 340 through the SMS server 330. The SMS server 330 can transmit the unique code to the receiving terminal 340 after receiving the address of the receiving terminal 340 from the data repeater 320.

Here, the address of the receiving terminal 340 may be a phone number, an IP address, a hardware address, or it may be an address that indicates a separate terminal.

The receiving terminal 340 that has received the unique code reports reception/non-reception of the data to a user through a self-notification means. Accordingly, the user connects the receiving terminal 340 to the display device 350, which supports an Internet connection, in order to confirm the corresponding data.

Here, the connection of the receiving terminal 340 to the display device 350 may be made by a wire or wireless means such as infrared communication, Bluetooth, home RF, wireless Internet, USB, IEEE 1394, RS-232, PS2, and parallel communication.

The receiving terminal 340 connected to the display device 350 transmits the corresponding unique code to the display device 350. Then, the display device 350 accesses the data repeater 320 via the Internet and requests the storage position of the data that corresponds to the received unique code. Accordingly, the data repeater 320 transmits the storage position of the corresponding data to the display device 350, and then the display device 350 accesses the data server 310 in which the data is stored to request the data. Accordingly, the data server 310 transmits the data to the display device 350, and then the display device 350 displays the received data.

The display device 350 may be a device that supports an Internet connection and that has a specified display unit, such as an Internet PC, Internet kiosk, Internet set-top box, or digital TV.

Accordingly, it is preferable, but not necessary, that the data server stores the data in a state that the data matches the metadata.

For reference, although the data repeater 320 stores the metadata such as the data format, data size, title of the data, storage position of the data, address of the sender, address of the receiver, and others, the SMS server 330 may transmit the metadata and the unique code to the receiving terminal 340 so that the receiving terminal 340 can store the metadata and the unique code. Accordingly, the receiving terminal 340 transmits the metadata that includes the data storage position information to the display device 350, so that the display device 350 can directly receive the data from the data server 310 without requesting the data repeater 320 to send the data storage position information.

Figure 4:
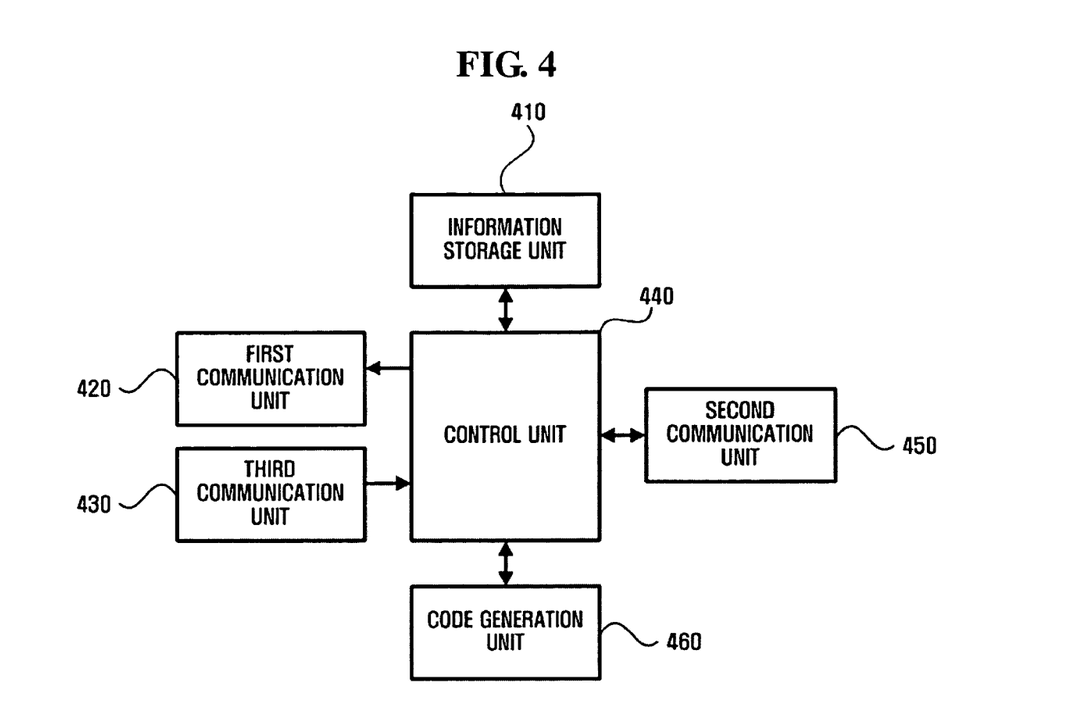
FIG. 4 is a block diagram illustrating a data repeater according to an embodiment of the present invention.

FIG. 4 is a block diagram illustrating the data repeater according to a non-limiting embodiment of the present invention.

The data repeater 320 includes an information storage unit 410, a first communication unit 420, a second communication unit 450, a third communication unit 430, a control unit 440 and a code generation unit 460.

The third communication unit 430 serves to receive the metadata such as the data format, data size, title of the data, storage position of the data, address of the sender, address of the receiver, and others, from the data server 310.

If the metadata is received, the code generation unit 460 generates the unique code that matches the received metadata, and transmits the generated unique code to the receiving terminal 340 through the SMS server 330.

In this case, it is preferable, but not necessary, that the unique code generated by the code generation unit 460 is transmitted to the receiving terminal 340 with the title of the data or the metadata, so that the receiver can confirm the type of the data.

It is also preferable, but not necessary, that the received metadata and the generated unique code are stored in the information storage unit 410 so that they match each other.

If the second communication unit 450 of the data repeater 320, which is in a standby state, receives a specified unique code from the display device 350, it transfers the unique code to the control unit 440. Accordingly, the control unit 440 extracts the metadata that matches the received unique code by searching the information storage unit 410, and then transmits the extracted metadata to the display device 350 through the second communication unit 450.

In this case, the metadata or only the data storage position information may be transmitted. Also, by transmitting the metadata with the unique code, a plurality of data may be displayed on the display device 350.

Figure 5:
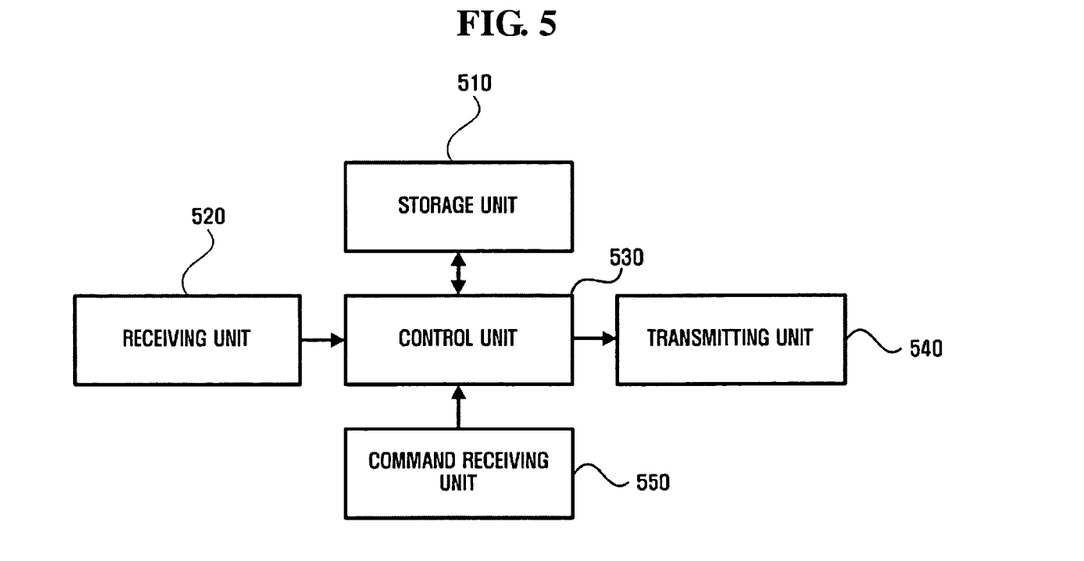
FIG. 5 is a block diagram illustrating a receiving terminal according to an embodiment of the present invention.

FIG. 5 is a block diagram illustrating the receiving terminal 340 according to a non-limiting embodiment of the present invention.

The receiving terminal 340 according to a non-limiting embodiment of the present invention includes a storage unit 510, a receiving unit 520, a control unit 530, a transmitting unit 540 and a command receiving unit 550.

The receiving unit 520 serves to receive the unique code transmitted by the data repeater 320 through the SMS server 330. The received unique code is assigned to the data that is transmitted from the sender to the receiver, and is stored in the data repeater 320 with the metadata.

The receiving unit 520 may receive the title of the data or the metadata in addition to the unique code, and thus, the user can confirm the type of the data through the title of the data or the metadata.

The storage unit 510 serves to store the received unique code, and if the title of the data or the metadata is received, it stores the title of the data or the metadata so that the title of the data or the metadata matches the corresponding unique code.

The command receiving unit 550 serves to receive a user's command for selecting at least one of the stored unique codes.

The user can confirm the unique code or metadata through the display unit of the receiving terminal 340, select data to be displayed, and make a separate display device 350 display the corresponding data. In this case, it is preferable, but not necessary, that the display unit of the receiving terminal 340 displays at least one set of the metadata that is familiar to the user rather than the unique code.

The transmitting unit 540 serves to transmit the unique code to the display device 350 according to the selection command received by the command receiving unit 550.

In this case, the transmission unit 540 can communicate with the display device 350 using at least one of communication means such as infrared communication, Bluetooth, home RF, wireless Internet, USB, IEEE 1394, RS-232, PS2, and parallel communication.

Additionally, the transmitting unit 540 can transmit the data storage position information among the metadata stored in the storage unit 510 to the display device 350 in addition to the unique code, so that the display device 350 can display the data by directly accessing the data storage position information received from the transmitting unit 540 without requesting the data repeater 320 to send the data storage position information.

The control unit 530 controls the operations of the device that includes the receiving unit 520, storage unit 510, command receiving unit 550 and transmitting unit 540.

For reference, the receiving terminal 340 may determine whether to receive the data according to the metadata. If the received data is a short message composed of text only or the size of the received data is not large, the receiving terminal 340 may directly receive and store the data. Meanwhile, the stored data may be displayed through the display unit or through a separate display device 350.

Figure 6:
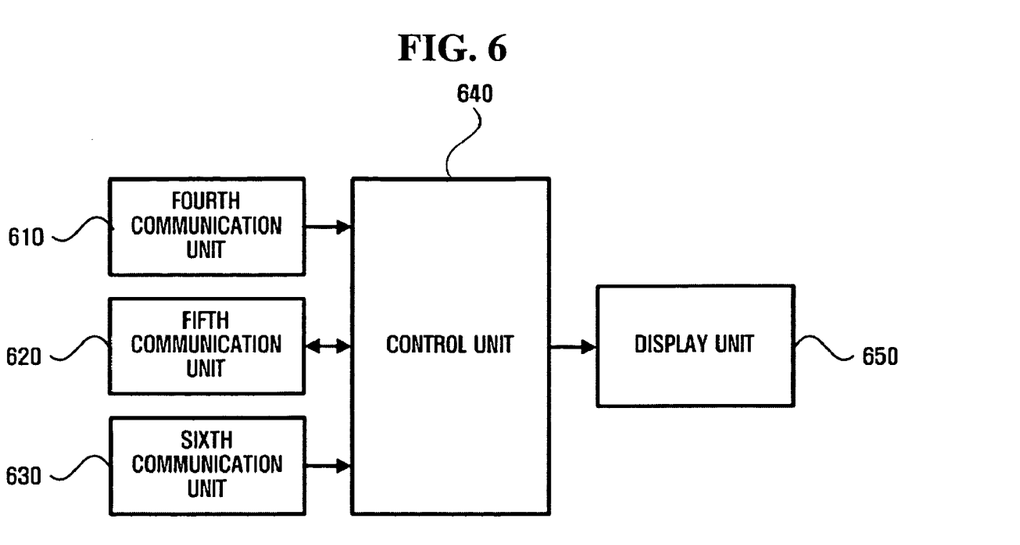
FIG. 6 is a block diagram illustrating a display device according to an embodiment of the present invention.

FIG. 6 is a block diagram illustrating the display device 350 according to a non-limiting embodiment of the present invention.

The display device 350 according to a non-limiting embodiment of the present invention includes a fourth communication unit 610, a fifth communication unit 620, a sixth communication unit 630, a control unit 640 and a display unit 650.

The fourth communication unit 610 serves to receive the unique code from the receiving terminal 340.

In this case, the fourth communication unit 610 can communicate with the receiving terminal 340 using at least one of communication means such as infrared communication, Bluetooth, home RF, wireless Internet, USB, IEEE 1394, RS-232, PS2, and parallel communication.

The unique code received by the fourth communication unit 610 is transmitted to the data repeater 320 by the fifth communication unit 620. In this case, it is preferable, but not necessary, that the unique code be transmitted with a message for requesting the data storage position information.

The data repeater 320 that has received the unique code and the message for requesting the data storage position information from the display device 350 searches for the metadata that matches the received unique code and transmits the corresponding data storage position information to the display device 350.

Accordingly, the display device 350 requests the transmission of the corresponding data by accessing the data storage device, i.e., the data server 310, and receives the data through the sixth communication unit 630.

Here, it is preferable, but not necessary, that the data storage position information includes the IP address of the data server 310, the name of the folder that stores the data, and the name of the data file.

The received data is outputted through the display unit 656. Here, the outputted data may be at least one of an e-mail, advertisement and document.

The control unit 640 serves to control all the operations of the device including the fourth communication unit 610, fifth communication unit 620, sixth communication unit 630 and display unit 650.

As described above, the display device 350 may receive the metadata in addition to the unique code from the receiving terminal 340, and in the case of receiving the metadata, it can receive and display the data by directly accessing the data server 310 with reference to the data storage position information included in the metadata.

Figure 7:
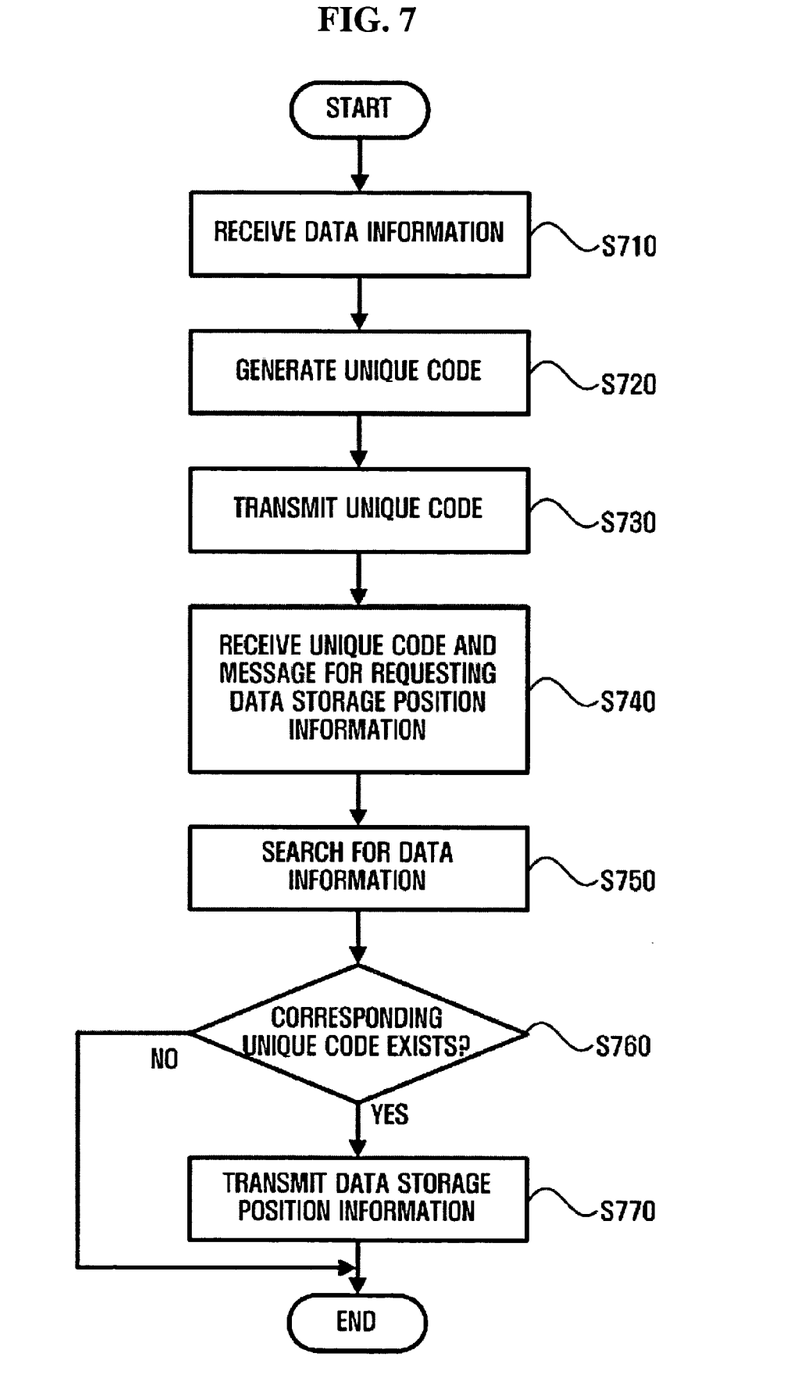
FIG. 7 is a flowchart illustrating a data repeating process performed by a data repeater according to an embodiment of the present invention.

FIG. 7 is a flowchart illustrating a data repeating process performed by the data repeater 320 according to a non-limiting embodiment of the present invention.

The sender accesses the data server 310 and transmits data to the data server 310 using a wired or wireless terminal. Accordingly, the data server 310 generates metadata of the received data and transmits the metadata to the data repeater 320.

The data repeater 320 that has received the metadata (S710) generates a unique code of the received metadata (S720) and stores the unique code in the information storage unit 410 so that the unique code matches the metadata.

Then, the data repeater 320 transmits the generated unique code to the receiving terminal 340 through the SMS server 330 with reference to the address of the receiving terminal 340 included in the metadata (S730).

Then, if the data repeater 320, which is in a standby state, receives a message for requesting the data storage position information together with the unique code from the display device 350 (S740), it checks whether the corresponding unique code exists in the metadata stored in the information storage unit 410 (S750).

If it is confirmed that the corresponding unique code exists (S760), the data repeater 320 transmits the data storage position information or the metadata to the display device 350 (S770). In this case, by transmitting the metadata with the unique code, a plurality of data may be displayed on the display device 350.

Figure 8:
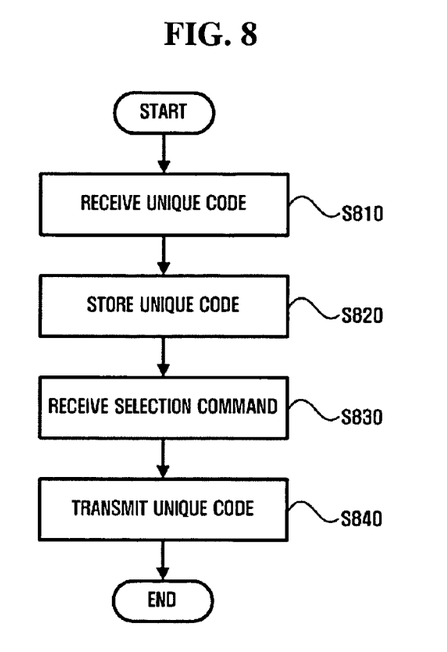
FIG. 8 is a flowchart illustrating a unique code transmitting/receiving process performed by a receiving terminal according to an embodiment of the present invention.

FIG. 8 is a flowchart illustrating a unique code transmitting/receiving process performed by the receiving terminal according to a non-limiting embodiment of the present invention.

If the sender transmits data to the receiver, the data is stored in the data server 310, and the data repeater 320 generates and transmits a unique code of the data to the receiving terminal 340. The receiving terminal 340 that has received the unique code (S810) stores the received unique code in the storage unit 510 (S820). Meanwhile, the data repeater 320 may transmit the title of the data or the metadata to the receiving terminal in addition to the unique code, and in this case, the receiving terminal 340 stores the title of the data or the metadata so that the title of the data or the metadata matches the unique code (S820).

The user of the receiving terminal 340 can confirm the unique code, title of the data or metadata through the display unit provided in the receiving terminal 340 and select the data to be displayed. The receiving terminal 340 that has received a data selection command (S810) transmits the unique code to the display device 350 that supports an Internet connection (S840), so that the display device 350 can display the corresponding data.

Here, the receiving terminal 340 communicates with the display device 350 using at least one of communication means such as infrared communication, Bluetooth, home RF, wireless Internet, USB, IEEE 1394, RS-232, PS2, and parallel communication. Additionally, the receiving terminal 340 may display the status of the communication with the receiving terminal 340 or the availability of the display function on its display screen.

For reference, the receiving terminal 340 may determine whether to receive the data according to the metadata. If the received data is a short message composed of text only or the size of the received data is not large, the receiving terminal 340 may directly receive and store the data. Meanwhile, the stored data may be displayed through the display unit or through a separate display device 350.

Figure 9:
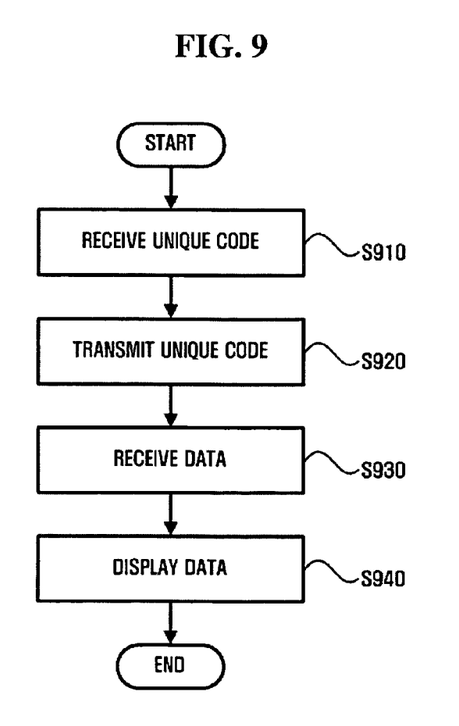
FIG. 9 is a flowchart illustrating a data displaying process according to a unique code performed by a display device according to an embodiment of the present invention.

FIG. 9 is a flowchart illustrating a data displaying process according to the unique code performed by the display device 350 according to a non-limiting embodiment of the present invention.

The display device 350 that has received the unique code from the receiving terminal 340 (S910) transmits the received unique code to the data repeater 320 (S920). In this case, it is preferable, but not necessary, that the unique code be transmitted with a message for requesting the data storage position information.

The data repeater 320 that has received the unique code and the message for requesting the data storage position information from the display device 350 searches for the metadata that matches the received unique code and transmits the corresponding data storage position information to the display device 350.

Here, it is preferable, but not necessary, that the data storage position information includes the IP address of the data server 310, the name of the folder that stores the data, and the name of the data file.

The display device 350 that has received the data storage position information receives the corresponding data by accessing the data server 310 with reference to the received data storage position information (S930), and the received data is displayed through the display unit 650 (S940).

As described above, the system and method for displaying received data using a separate device according to the present invention has the following effects.

First, by confirming the received data through a separate display device, the limitations of the display performance of the receiving terminal can be overcome, and the received data can always be confirmed at any place where the display device is installed.

Second, since the data can be received and displayed using the unique code only, the user information input process for confirming the data can be omitted.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for displaying received data using a separate device, comprising:
    a code generation unit configured to generate a first unique code that matches metadata received from a data server that stores the data and the metadata;
    a first communication unit configured to transmit the first unique code to a receiving terminal; and
    a second communication unit configured to receive a second unique code from a display device and to transmit the stored metadata that matches the first unique code to the display device if the first unique code corresponds to the second unique code.

2. The apparatus as claimed in claim 1, wherein the data is at least one of an e-mail, an advertisement and a document.

3. The apparatus as claimed in claim 2, wherein the data is at least one of text, a still image and a moving image.

4. The apparatus as claimed in claim 1, wherein the metadata includes at least one of a data format, a data size, a title of data, a data storage position, an address of a sending terminal and an address of a receiving terminal.

5. The apparatus as claimed in claim 1, further comprising a third communication unit configured to receive the metadata.

6. An apparatus for displaying received data using a separate device, comprising:
- a first communication unit configured to receive a unique code of specified data from a receiving terminal;
- a second communication unit configured to transmit the received unique code to a data repeater and to receive metadata of the data that corresponds to the unique code from the data repeater;
- a third communication unit configured to receive the data that corresponds to the metadata from a data server that stores the data and the metadata; and
- a display unit configured to output the data that is received by the third communication unit.

7. The apparatus as claimed in claim 6, wherein the data is at least one of an e-mail, an advertisement and a document.

8. The apparatus as claimed in claim 7, wherein the data is at least one of text, a still image and a moving image.

9. The apparatus as claimed in claim 6, wherein the metadata includes at least one of a data format, a data size, a title of the data, a data storage position, an address of a sending terminal and an address of a receiving terminal.

10. The apparatus as claimed in claim 6, wherein the first communication unit receives the unique code by at least one of communication means including infrared communication, Bluetooth, home RF, wireless Internet, USB, IEEE 1394, RS-232, PS2 and parallel communication.

11. A method for displaying received data using a separate device, the method comprising:
- generating a first unique code that matches metadata received from a data server that stores the data and the metadata;
- transmitting the first unique code to a receiving terminal; and
- receiving a second unique code from a display device and transmitting the stored metadata that matches the first unique code to the display device if the first unique code corresponds to the second unique code,
- wherein the metadata corresponds to the received data transmitted from the data server.

12. The method as claimed in clam 11, wherein the data is at least one of an e-mail, an advertisement and a document.

13. The method as claimed in claim 12, wherein the data is at least one of text, a still image and a moving image.

14. The method as claimed in clam 11, wherein the metadata includes at least one of a data format, a data size, a title of data, a data storage position, an address of a sending terminal and an address of a receiving terminal.

15. A method for displaying received data using a separate device, the method comprising:
- receiving a unique code of specified data from a receiving terminal;
- transmitting the received unique code to a data repeater and receiving metadata of the data that corresponds to the unique code from the data repeater; and
- receiving and outputting the data that corresponds to the metadata from a data server that stores the data and the metadata,
- wherein the metadata corresponds to the received data transmitted from the data server.

16. The method as claimed in claim 15, wherein the data is at least one of an e-mail, an advertisement and a document.

17. The method as claimed in claim 16, wherein the data is at least one of text, a still image and a moving image.

18. The method as claimed in claim 15, wherein the metadata includes at least one of a data format, a data size, a title of the data, a data storage position, an address of a sending terminal and an address of a receiving terminal.

19. The method as claimed in claim 15, wherein the receiving the unique code from the receiving terminal involves receiving the unique code by at least one of communication means including infrared communication, Bluetooth, home RF, wireless Internet, USB, IEEE 1394, RS-232, PS2 and parallel communication.

* * * * *